United States Patent [19]
Hay

[11] 3,903,958
[45] Sept. 9, 1975

[54] PROCESS AND APPARATUS FOR MODULATING TEMPERATURES WITHIN ENCLOSURES

[76] Inventor: Harold R. Hay, 2424 Wilshire Blvd., Los Angeles, Calif. 90057

[22] Filed: Feb. 17, 1971

[21] Appl. No.: 114,977

Related U.S. Application Data

[63] Continuation-in-part of Ser. No. 668,202, June 26, 1957, abandoned, and Ser. No. 163,381, Dec. 19, 1961, abandoned, and Ser. No. 482,027, Aug. 16, 1963, Pat. No. 3,299,589, and Ser. No. 610,597, Jan. 20, 1967, Pat. No. 3,450,192, and Ser. No. 815,785, April 14, 1969, Pat. No. 3,563,305.

[52] U.S. Cl. .................... 165/2; 165/50; 62/314
[51] Int. Cl. ............................................ F24f 3/00
[58] Field of Search .......... 165/1, 2, 60, 50, 22, 49; 62/314, 259 RC, 467 R

[56] References Cited
UNITED STATES PATENTS
2,889,763 6/1959 Pine ................................. 62/314
3,563,305 2/1971 May .................................. 165/2

*Primary Examiner*—Charles Sukalo

[57] ABSTRACT

Enclosure temperatures are modulated by water heated by solar energy and cooled to ambient air. Control means include moving exterior insulation, enclosing or exposing the water, using forced air, and providing special means for heat storage and transfer. Water ponds horizontally disposed atop the enclosure, or in floor plenums and frequently in direct thermal exchange with underlying space, or water circulating in walls by thermosiphon action may be used separately or in combinations with the control means.

18 Claims, 13 Drawing Figures

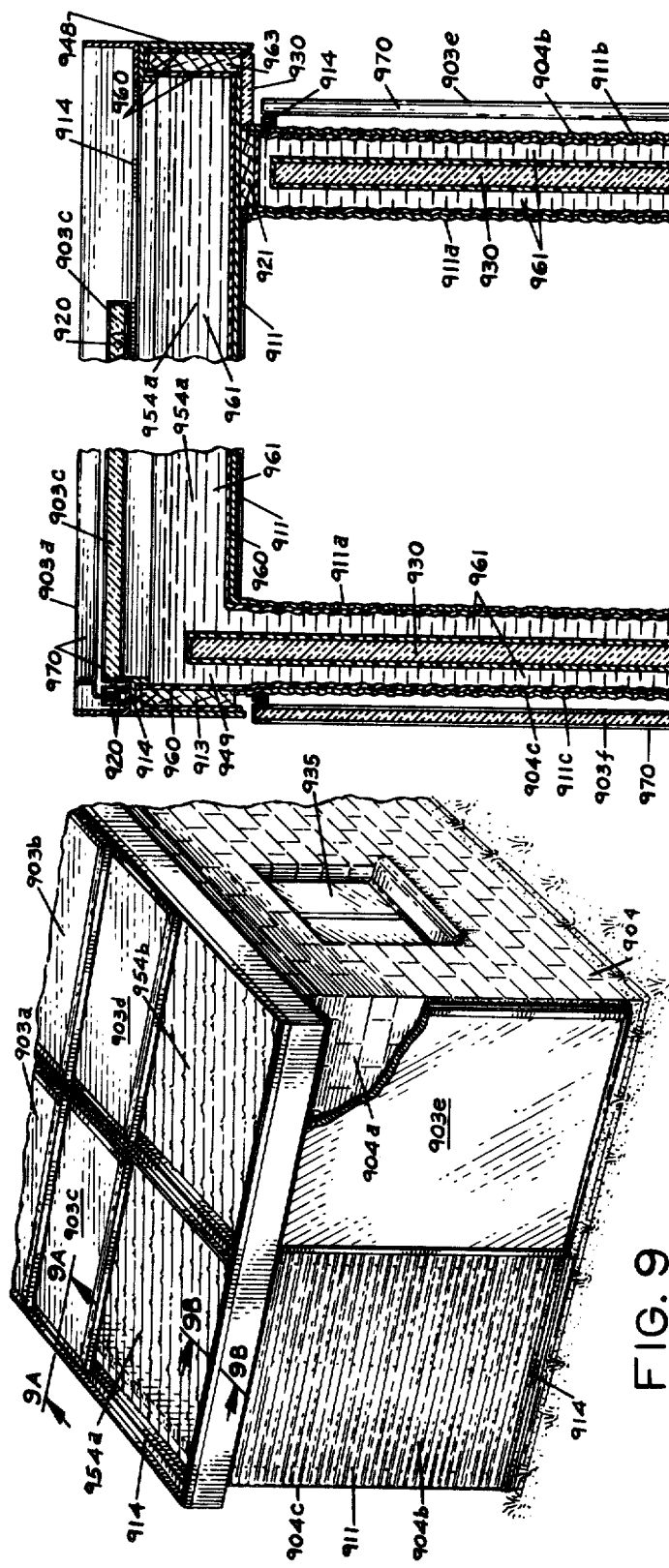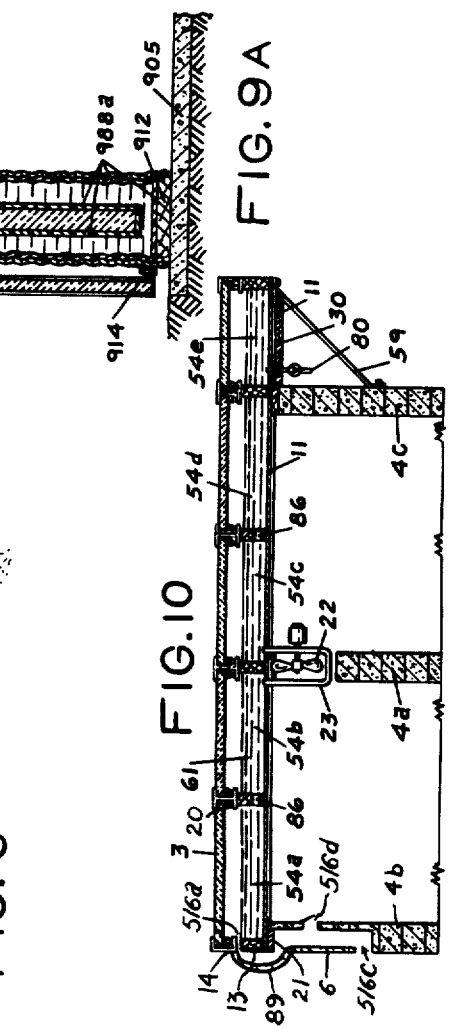

PROCESS AND APPARATUS FOR MODULATING TEMPERATURES WITHIN ENCLOSURES

RELATED APPLICATIONS

This application is a continuation-in-part of my prior applications Ser No. 688,202, filed June 25, 1957 now abandoned; Ser. No. 163,381, filed Dec. 19, 1961, now abandoned; Ser. No. 482,027, filed Aug. 16, 1963 issued as U.S. Pat. No. 3,299,589; Ser. No. 610,597, filed Jan. 20, 1967, issued as U.S. Pat. No. 3,450,192; and Ser No. 815,785, filed Apr. 14, 1969, issuing as U.S. Pat. No. 3,563,305 on Feb. 16, 1971.

This invention relates to a process and apparatus for controlling the temperatures of substances and enclosures; it primarily involves the collection of solar energy and the dissipation of heat to the night sky or to ambient air. More particularly, the invention relates to the novel design of enclosures and to simple or automatic manipulations of means, in conjunction with or independent of the movable insulation thermal-valve means of my prior inventions, to modulate temperatures within an enclosure as a whole, or of its various components or contents. This modulation is accomplished, in some cases, in conjunction with novel means for increasing or retarding evaporation, novel thermosiphon means for heating and cooling, and novel means for thermal transfer and storage though each of the novel means may be used separately or in various combinations.

The novel means, singly or in combination, may be incorporated into a building to maintain internal temperature as closely as possible within a narrow range. In other embodiments, the means may be incorporated into, or onto, other enclosures or devices, as, for example, water heaters or coolers, solar stills, storage containers, etc. It is irrelevant in what form of enclosure, or for what purpose, the temperature modulation is achieved by means of my invention.

The primary object of this invention is to provide an improved process and means for controlling the collection and dissipation of heat characterized by low-cost installation, operation, and miantenance. Another object is to provide an improved process and means to control the collection or the loss of heat so as to maintain the interior of an enclosure, or components or portions of an enclosure, or materials or objects within the enclosure, nearer a desirable temperature.

It is an object of this invention to provide a measure of heat control by moving structural components of an enclosure into different positional relationships to other components wherein the components are selectively composed of materials having different heat storage and heat transfer characteristics and the movement is selectively timed in relation to external temperatures.

Moreover, it is an object to provide a process and means for increasing or decreasing the evaporation of a liquid acting as a heat collector or heat dissipator which may be least partially confined by a structural member forming an enclosure which may be a building.

It is a further object to provide a process and means for heating or cooling an enclosure by a liquid thermosiphon effect within a heat collector or a heat dissapator, often at least partially formed by a structural member of said enclosure. An additional object of this invention is to provide a process and means for thermal transfer into and from a liquid and to influence heat transfer and loss by means of a movable thermal barrier. It is also an object of this invention to control the collection of heat in, and dissipation of heat from, a liquid in relation with an enclosure the temperature of which is to be affected by said liquid.

It is another object to cool air within a plenum formed in part by a structural element of a room and to force said air to a second plenum for purposes of cooling space contacting a structural element of a room forming at least in part said second plenum. Moreover, it is an object to cause said cooled air to enter said room or to flow near an outside wall of said room for the purpose of cooling said room. And it is an object to transfer the liquid cooled within said plenum to a second location where it cools at least partially enclosed space.

It is an added object to provide an improved process and means for heating or cooling a water supply for domestic or other use; and it is an object of this invention to control the temperature of thermally sensitive objects and of processes such as evaporation, distillation, heat storage and transfer, and all such processes as are influenced by thermal change within an enclosure or in a confined volume. Other objects and advantages of the present invention will become more apparent after reading the following descriptions taken in conjunction with the drawings.

The invention is capable of receiving a variety of mechanical expressions illustrated on the accompanying drawings, but it is to be explicitly understood that the drawings are for illustration only and are not to be construed as defining the limits of the invention, reference being had to the appended claims for that purpose.

FIG. 8 is a diagrammatic cross section of a waterheating device with a heat transfer means.

FIGS. 9, 9A, and 9B, respectively, are diagrammatic views of an embodiment of this invention using thermosiphon action to circulate liquid in a wall. FIG. 9 is an exterior, partially cutaway, perspective of a building with movable insulation to control heat gain or loss on a wall. FIG. 9A is a cross section of a wall with a thermosiphon means for thermal control. FIG. 9B is an alternative deaign for thermosiphon thermal control.

FIG. 10 is a diagrammatic cross section of a building with a fancoil means for transferring roof pond thermal effects to an enclosure.

The following descriptions of various embodiments of my invention will be primarily related to the control of thermal transfer between described components of an enclosure and such natural means for heating as solar irradiation and such means for cooling as night-sky radiation, convection, or dissipation of evaporated liquids to the atmosphere. Within the meaning of this invention, however, the heating and cooling effects may be the result of fuel or other energy and conventional means or devices or by combinations of these effects with natural means. Also within the meaning of this invention, the enclosure may be a container, a building, or any structure having or capable of having, applied to it the elements of the embodiments to be described. Furthermore, the space is understood to be air to be thermally controlled and which may underly or be remote from the novel heating or cooling means but affected thereby; and useful thermal results are obtained if the structure or space is only partially enclosed.

Figure 1:
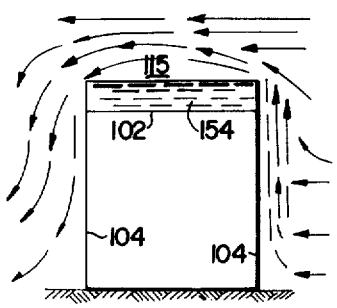
FIG. 1 is a diagrammatical sectional view of an enclosure obstructing air flow which assumes the general pattern indicated by arrows.

FIG. 1 shows the effect of a structure with a roof pond on natural wind patterns as determined by smoke tests or wind velocity measurements. Low velocities of 1 to 10 miles per hour cause air flow essentially parallel to the ground until the air impinges an obstructing surface such as on of the outside walls 104 of an enclosure. Then, air passes partially around the obstruction and partially across its tip. Air flow over the structure with a flat roof 102 and roof pond 154 produces an air space 115 of little or no air movement. This condition adversely affects water evaporation from ponds 154 and retards cooling the enclosure with which the pond water is capable of thermal exchange.

Wind scoops on ships, and on housetops in Hyderabad, Pakistan, direct air flow to interiors of enclosures for ventilation and for evaporation of water directly from the skin of people. Prior art has also used wind scoops to direct dry air against damp surfaces, such as earthernware jugs, to cool water. Instead of such separate, unsightly, and costly scoops, I use the wall of the structure, and the ground, as major portions of the scoop and add a deflector near the top of the wall at approximately roof-pond level. A portion of the deflector may protrude from the wall to trap wind impinging thereon. For this purpose, I may combine the function of the deflector with one or more useful devices, such as a water heater, a solar still, a rain collector, a shading projection, or the movable thermal barrier often a part of my means for controlling temperature.

Figure 2:
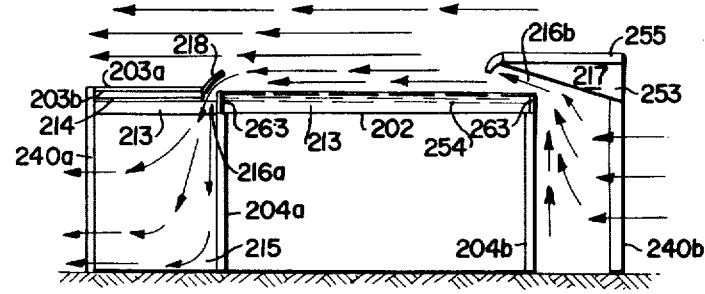
FIG. 2 is a diagrammatic cross section showing means for causing air movement to approximately parallel the upper surface of an enclosure.

FIG. 2 shows an embodiment of my invention in which wind flow, indicated as arrow lines, impinging upon wall 204b is trapped under member 217 and is caused to flow through a passage 216b in a direction approximetely parallel to and in close proximity with the water surface of roof pond 254. With properly shaped deflectors, such as those of 217 and 218 of FIG. 2, air velocities at least as high as those prevailing before impingement on wall 204b obtain near the surface of pond 254. The significance of this is evident from the fact that when 44 Btu of heat is lost from a square foot of pond surface by evaporation into still air, 75.5. Btu are lost with the air moving only 2 miles per hour. This difference can readily lower pond temperatures and convert a condition of thermal discomfort within an enclosure cooled by the pond to one of comfort.

The embodiment of FIG. 2 comprises space shown partially enclosed by walls 204a and 204b made of concrete or any material capable of supporting wood or metal roof beams 213, shown extended beyond wall 204a to post 204a, supporting roof pond 254 confined above metal roof sheets 202 fastened under beams 213 by screws not shown. Roof pond 254 is confined between two beams 213, crossing the enclosure, and end closures 263 between the beams and shown here as above walls 204a and 204b. The ponds are lined with a suitable material such black, flexible polyethylene film shown better in FIG. 6 crossing over beams 213 and end closures 263 to provide a weather-tight roof above the enclosure. Atop the beams 213 are aluminum trackways 214 of types standard for overhead closet doors in which insulation panels 203a and 203b, having suitable metal framing with attached wheels (not shown), can be moved with a drawcord passing over pulleys to a winch all as better shown in FIGS. 5 and 6. The insulating panels 203a and 203b, preferably of rigid polyurethane foam about 2 inches thick and framed in extruded aluminum channels and painted or clad to prevent deterioration by solar irradiation, may be stacked, as better shown in FIG. 5, over the extended beams when roof pond 254 is to be exposed for evaporation cooling and they may completely cover pond 254 when desired.

To the right in FIG. 2, wind-trapping member 217 is supported by posts 240b and fastened to beams 213 or to wall 204b in a manner (not shown) leaving preferably an elongated opening 216b, usually not less than 1 inch nor more than one foot in height, between pond closures 263 and the under side of wind-trapping member 217 which may have its extremity near the pond turned down slightly to further cause air flow through passage 216b to parallel the water surface of pond 254 and to have high velocity.

Wind-trapping member 217, of FIG. 2, is shown comprising in combination element 255 which may be an elongated water heater or solar still of types to be later described, and below this an elongated water tank shown as triangular shape 253. The upper surface of member 217 may be provided for rain catchment and the member may shade a walkway between wall 204b and posts 240b, though, in other instances, no such multiple purpose need be served by member 217.

Figure 4A:
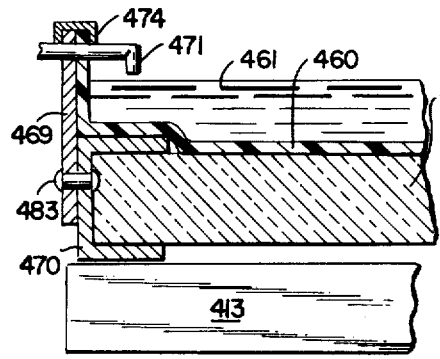
FIGS. 4A and 4B are fragmentary sectional representations of two means for confining liquid to be cooled by evaporation on top of movable insulation.
Figure 4B:
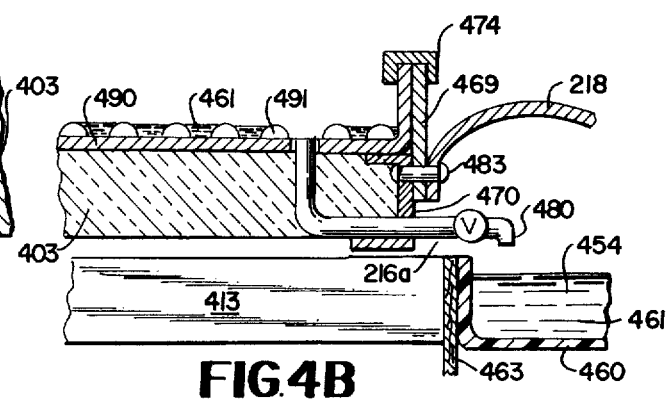

To the left of FIG. 2, deflector 218 is a piece of elongated metal, plastic, wood, or other suitable material fastened by screws or other means to the framing of top movable insulation panel 203a as better shown in FIG. 4B. The space 216a between two beams 213 forms a passage for upward-flowing air impinging on wall 204a when prevailing winds are from the direction opposite that shown by the arrows. Deflector 218 causes air flow through passage 216a to be directed parallel to the surface of the pond after passing over end closure 263.

In operation, cooling of the enclosure is obtained by exposing pond 254 at night by moving insulating panels 203a and 203b from an extended position overlying pond 254 to a position so far to the left of wall 204a as to leave an open passage 216a under deflector 218. If prevailing winds are as shown by arrow lines of FIG. 2, air will be deflected by member 217 toward pond surface 254 and travel substantially parallel thereto until at least partially trapped by deflector 218 which causes the air to flow toward the ground and to resume the course it had prior to impinging on wall 204b. Air deflected around the enclosure sides, rather than over it, tends to converge again at the left side of FIG. 2 adding to the creation of a partial vacuum near wall 204a at ground level which also helps draw air through passage 216b and thereby parallel to pond 254 in a manner conducive to create a higher air velocity.

Figure 5:
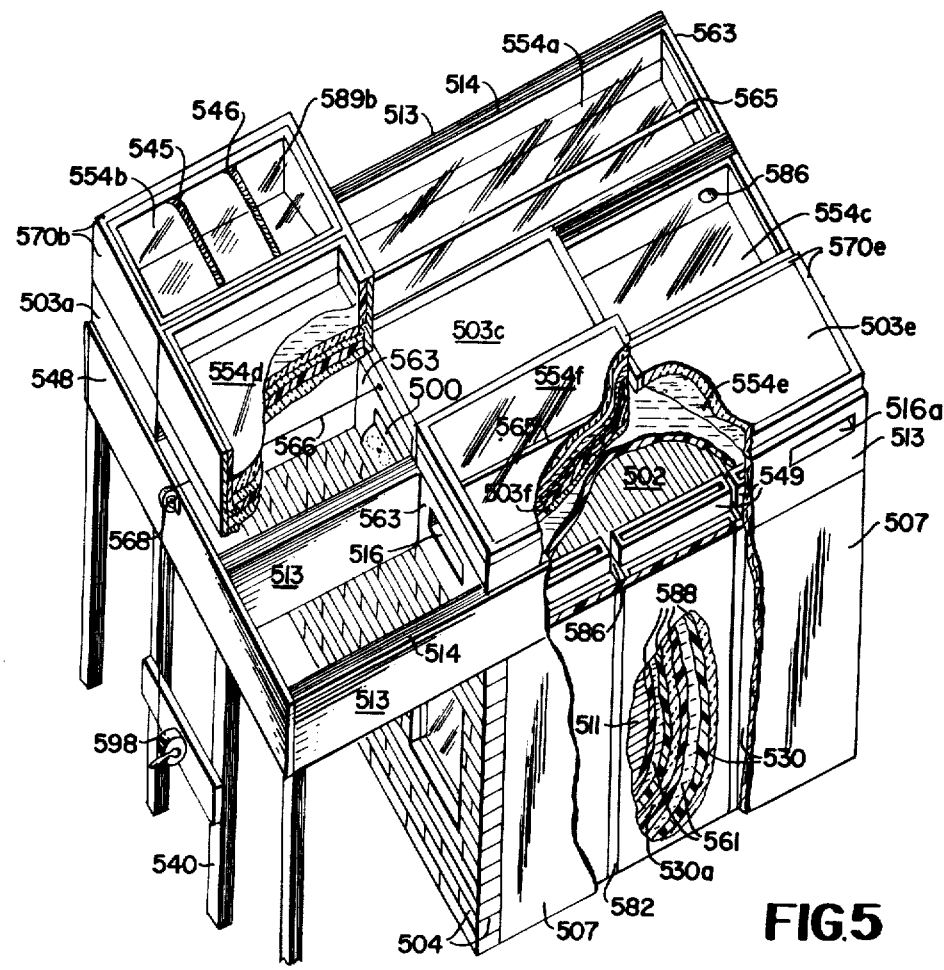
FIG. 5 is a diagrammatic perspective and partially cutaway view of an enclosure showing details of roof ponds and wall construction.

When winds reverse direction from that shown by FIG. 2, arrows, deflector 218 and member 217 still act to increase evaporation and cooling of exposed water in pond 254. When the pond is adequately cooled, or about one hour after sunrise, the movable insulation 203a and 203b is positioned over pond 254 to prevent absorption of solar energy or ambient heat which would warm the pond. Pond water, often cooled several degrees below minimum morning air temperature by nighttime evaporation, can then keep space within a suitably designed enclosure at comfortable temperatures throughout days with 110°F ambient air. The ponds may absorb heat from this space through a metal ceiling 202 which is the pond support or pond water may be transferred by pump, thermosiphon, or other suitable means to a remote device, such as a fan coil or radiant panel for heat exchange with the space. Such a thermosiphon system is shown in FIG. 5; the device in the form of a fan coil is shown in FIG. 10 and provides the pumping action for transferring the liquid as will be described later.

Wind deflectors of the type of 218 may be mounted directly to roof beams 213, or to the fascia of buildings and extend outward from the walls to scoop and direct wind on all sides of a roof to benefit from winds originating from any direction. Moreover, the enclosure walls may be extended beyond the enclosed area to largely eliminate wind deflection around the sides of the building and to increase air flow across the roof-pond.

If the novel system for deflecting natural wind across roof ponds does not provide adequate evaporation cooling, forced air may be employed. An electric fan, or blower unit of the standard type, mounted to discharge air across uncovered ponds at night is an effective means for cooling the water. With much greater advantage, I have found that a fan or blower can be mounted to force air over the pond while the insulation is positioned above the pond. In FIG. 5, an opening 516 through end closure 563 and the pond liner (not shown), and above the surface of pond 554e, can admit unsaturated air which undergoes and causes cooling while passing across the pond surface and under insulation panels 503f and 503e to an outlet 516a to the exterior of the building or while passing to outlet 516b leading to a second plenum. A fan or blower shown diagrammatically as 500 mounted on end closure 563 of pond 554c, may be used to force the air through an associated opening similar to 516, or natural air currents may be trapped under a suitable deflector (not shown but of the type of 218 of FIG. 2) mounted above opening 516 to direct an increased flow of air through opening 516.

Although the last mentioned embodiments function effectively with the fixed insulation over ponds to form plenums with zones for air flow, I prefer movable insulation in order to collect solar energy for heating an enclosure on winter days. Insulation which is movable may be either positioned to expose the pond, if that is desired, or left over the ponds to form the plenum, or plenums, if that position is indicated.

The air directed through the plenum formed by the surface of pond 554e, insulating panels 503f and 503e, and beams 513 of FIG. 5 is cooled and humidified. During very dry days conventional means may discharge this conditioned air into the enclosure underlying pond 554e, or some other enclosure. This is better shown in FIG. 10 where it is made clear that air forced into the plenum over pond 54a can be made to pass through beam opening 516a, through duct 89, through cavities of hollow block wall 6, and through opening 516d into the space underlying pond 54a. This means for raising the moisture content within the space at least partially enclosed under pond 54a may be controlled by a damper shown associated with opening 516d to provide optimum humidity. During days of high relative humidity by closing the damper on 516d the cooling effect of air passing through duct 89 may be partially transferred through the hollow block masonry to the enclosed space without increasing the humidity of said space. The cooled air would then be caused to discharge out opening 516c forming an air curtain down at least part of the outer surface of wall 4b. In like manner, air forced by fan blower 500 of FIG. 5, cooled in passage over ponds 554c and 554e, may be caused to flow out openings 516 and 516a to form a cool air curtain near walls 504 and windows or doors therein which are usually sources of high heat infiltration.

Evaporation of water from roof ponds can be increased by a wicking device whether the ponds are covered or uncovered; and forced air may be introduced under the surface of the liquid if desired. In another embodiment, a multistoried building may be cooled without involving insulation movable or fixed. The floor design may include a plenum lined with plastic, metal, or other water-tight material to confine water to be evaporated by air forced through a zone in the plenum; the cooling effect can then be transferred by conduction or by circulating the water through a fan coil to modulate temperatures of space both above and below the plenum floor. For example, a second-story floor of concrete with downward extending beams closes three sides of a plenum; an acoustical ceiling of metal may be fastened to the underside of the beam to complete the plenum and support an enclosed tray of water about one inch deep. A float valve may be used to maintain water level in the tray and an overflow provided for occasional flushing or to drain excess water. Air blown into the plenum may be exhausted from its zone of movement through ducts for any purpose earlier mentioned. Both the air and the water will be cooled by water evaporation and will act while within the plenum to cool the room below and the room above.

FIG. 5 shows an embodiment of my invention in which a thermosiphon means within a wall effects heat transfer between space within an enclosure and a roof or plenum pond. This embodiment is of particular value to cool the space when there is inadequate heat exchange through structural elements of the pong; or, it can be used to cool enclosures not underlying the pond. Some elements and materials of the embodiment are described in my issued patents of which this is a continuation-in-part, and in other embodiments herein.

Figure 6:
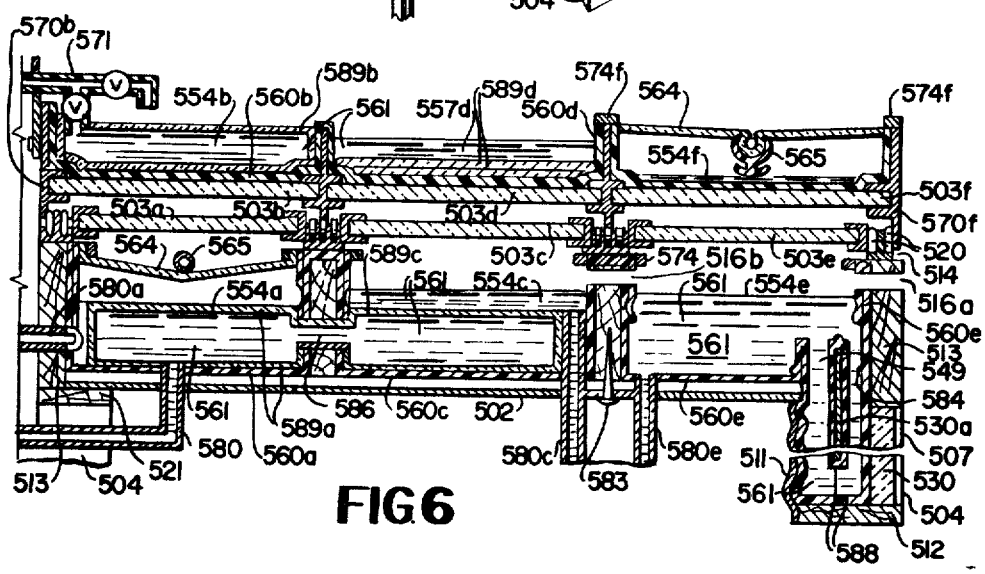
FIG. 6 is a diagrammatic sectional view of details of the roof construction and fragmentary details of the wall construction of FIG. 5.

As shown in FIGS. 5 and 6, walls 504 and wall plates 521 support beams 513 on the under side of which are fastened by nails 583, screws, or other means, corrugated metal sheets 502 forming the ceiling of the enclosure and the bottom of roof pond 554e having a black plastic liner 560e over which water 561 is preferably maintained about 6 to 7 inches deep when the pond is to be used for winter heating. For clarity, it should be mentioned here that ponds 554a, 554b, 554c, 554d, and 554f do not relate to the thermosiphon action in pond 554e but involve other embodiments of this invention which will be discussed later — though they may co-exist on a roof structure and would be similarly affected by the panels of movable insulation. Pond 554e is shown covered by the insulation panels 503e and 503f in their extended position in FIG. 5; the panels are shown in FIG. 6 as if stacked over pond 554e. The insulation of panels 503e and 503f is best shown in FIG. 6 as being framed in an aluminum extrusion such as 570f to which wheels 520 are fastened to move the panels in trackway 514 atop beams 513. Movement of the panels may be made independent of each other or they may be made to move in an interlocking manner so that a single device such as the winch 598 and drawcord 566 move all insulation panels above the ponds, and to position them over a carport or other suitable area best shown in FIG. 5 where support is provided by extensions of beams 513 and by posts 540.

At least a portion of one wall of the enclosure is formed into a thermosiphon element which contains water 561 in common with roof pond 554e. The thermosiphon wall may be variously constructed; it is shown in FIGS. 5 and 6 as having an inside surface of metal sheets 511 with corrugations horizontally disposed and fastened by lag screws (not shown) to wall studs 582 shown only in FIG. 5. The outer surface of the wall may consist of ¾ inch thick exterior grade plywood sheathing 507 likewise fastened by lag screws to studs 582. Other parts will be described in relation to the thermosiphon action.

As best shown in FIG. 6, thermosiphon action is established through one or more U-shaped lengths of layflat plastic tubing 588 sealed to the roof-pond liner 560e at seals 584 with one of the legs doubled and extending upward to form a "chimney" 549 rising somewhat above mid-depth of pond 554e. Chimneys 549 are shown best in FIG. 5 on both sides of a stud 582 terminating at the level of the bottom of the pond; where the upper ends of the studs are covered by the liner 560e and a channel 586 is formed between the chimneys. These channels permit cold water at the bottom of the pond 554e to pass around the chimneys 549 and, owing to the higher density of the cold water, to flow down the short leg of the U-shaped siphon tube 588 shown toward the outside of wall 504.

So that cold water in the short outer leg absorbs less heat through exterior sheathing 507, a 1.5-inch thick sheet of rigid polyurethane insulation 530 is between them. Also, a 0.5-inch thick sheet of the insulation 530a separates the short and long legs of the thermosiphon tube to retard heat transfer and maintain the temperature differential causing thermosiphon action. Insulation 530a may extend above the bottom of pond 554e to help form the chimney 549 and stops short of the bottom of the wall cavity where the U-shaped thermosiphon rests between the studs on floorplate 512 or on cross bracing, or other suitable support between the studs, at a higher level.

The long leg of the thermosiphon, as shown in FIGS. 5 and 6, starts at the floor plate 512 and ends at the top of chimney 549. Within the wall cavity, it directly contacts corrugated metal sheets 511 forming the inside surface of the wall. Heat from the room readily passes through metal sheets 511 and the thin, 20 mil, flexible plastic and is absorbed by water 561 in the long leg of the thermosiphon where, by virtue of the lower density of warm water, it rises while the colder water from the short leg replaces it in thermosiphon action. It has been found that as little as 0.5° F differential in the short and long legs is sufficient to initiate thermosiphon action. The warmed water in the long leg flows out chimney 549 and stratifies adequately in the upper portion of pond 554e to permit the more dense colder water at the bottom of the pond to pass down the short leg of the thermosiphon.

The thermosiphon device of FIGS. 5 and 6 is substantially limited to cooling an enclosure having a roof or plenum pond or other high-level reservoir of cold water. Thermosiphon cooling depends, in the embodiments described, upon cooling pond 554e at night by moving the insulation panels 503e and 503f from the daytime position over the ponds to a nighttime position not over the ponds. Used in conjunction with a plenum and forced air evaporation of liquid, however, thermosiphon action can be maintained at a more constant temperature level than the cyclic diurnal cooling of an open pond permits. Thermosiphon cooling is inexpensive since corrugated sheets of various thickness to withstand normal head pressures from the water are standard; seamless polyethylene layflat tubing can be used for the U-shaped thermosiphon; and rigid polyurethane is thermally efficient in the thin sheets allowing practical construction.

FIG. 9 is an exterior, partial view of an enclosure having two additional thermosiphon embodiments disclosed in relation to FIGS. 9A and 9B. Wall 904, in FIG. 9, is conventional masonry with a window 935. The facing wall, shown with a masonry first portion 904a and a second portion 904b with an exterior of corrugated metal 911 which forms part of my thermosiphon means for controlling space temperatures within the enclosure shown in detail in FIG. 9B. Wall portions 904a and 904b, and insulation 903e, which is movable on track 914, have areas such that insulation 903e covers at least a portion of wall 904a when exposure of wall portion 904b is desired and covers substantially all of wall 904b when that is advantageous.

Roof ponds 954a and 954b are confined between beams over walls 904 and 904c and center beam 913 on which trackways 914 facilitate positioning insulation panels 903a, 903b, 903c, and 903d to either cover or expose said ponds. Pond 954b is not related to discussion of the embodiments of FIGS. 9A and 9B though it may be interconnected with pond 954a which is a functional element of the embodiment of FIG. 9A but not of that of FIG. 9B which it is shown to be overlying in part. Enclosure wall 904c, opposite wall 904, incorporates the embodiment of FIG. 9A and is to be considered as constructed of two portions comparable to 904a and 904b and with an exterior movable insulation panel of the type of 903e.

The thermosiphon embodiment of FIG. 9A differs from that of FIGS. 5 and 6 by being effective for solar heating whereas that of FIGS. 5 and 6 is primarily effective for cooling the enclosure and may be mounted in a wall not subject to exposure to solar irradiation. Construction differences are primarily in the exterior portions of the wall and in having the long thermosiphon leg toward the outside of the FIG. 9A embodiment.

In FIG. 9A, pond 954a within liner 960 is confined by corrugated ceiling sheets 911 and beam 913 on which trackway 914 permits positioning insulation 903a and 903c in framing 970 to which wheels 920 are fastened. Wall 904c is constructed of exterior, dark-colored metal sheets 911c and interior metal sheets 911a fastened to floor plate 912 over floor 905 and to studs (not shown) as described in the embodiment of FIGS. 5 and 6. Within the FIG. 9A wall cavity, formed by said studs and metal sheets 911a and 911c, a length of layflat tubing 988a is doubled back at floor plate 912 to form two thermosiphon legs sealed at the top to pond liner 960 as described for the embodiment of FIGS. 5 and 6. Water 961 in pond 954a circulates freely under thermosiphon action with water 961 in wall 904c. Separating the two thermosiphon legs is insulation 930 extending laterally between two studs (not shown) and vertically from a position about an inch above floor plate 912 to a position approximately mid-depth of pond 954a. The long thermosiphon leg ends in a chimney 949. Because chimney 949 extends above two studs, channels formed between two adjacent chimneys, similar to the channels 586 of FIG. 5, are preferably blocked by a dam of plastic or eliminated by having the studs extend upward, but covered by pond liner 960, to the top of insulation 930.

In operation, insulation 903f is moved on trackway 914 from the nighttime position illustrated in FIG. 9A, to expose metal 911c to solar rays. Heat absorbed by metal 911c is conducted to water 961 in the long thermosiphon leg warming it more than 0.5° F above the temperature of water 961 in the inner short leg and starting thermosiphon action in the wall cavity. Rising water overflows chimney 949 and stratifies atop pond 954a adequately for cooler water at the bottom of said pond to descend through the short thermosiphon leg for heat exchange with inner metal 911a of wall 904c to modulate temperatures within the enclosure. Insulation 903f is returned to its nighttime position covering exterior metal 911c when adequate heat has been absorbed and to prevent heat loss at night.

The FIG. 9A embodiment is operative for cooling space underlying pond 954a if insulation 903f is positioned away from metal 911c at night to permit radiation of heat from the outer, long, thermosiphon leg to the night sky. When this radiation cooling causes the average density of water in the long leg to be greater than that in the inner, short leg, the direction of thermosiphoning is reversed with warmer water rising into pond 954a through the short leg. More short-circuiting of water across the top of chimney 949 and from one leg to the other occurs when this embodiment is used for cooling than when it is heating. Clearly, pond 954a may have its temperature affected by thermosiphon action controlled by movable insulation 903f or without the existence of this movable insulation and without movement of the insulation panels 903a and 903c from a position covering said pond. Or, pond temperature may be affected by proper positioning of all three insulation panels 903a, 903c, and 903f in a manner to produce optimum heating or cooling of space within the enclosure.

FIG. 9B represents an embodiment in which thermosiphon action is restricted in wall 904b. Roof pond 954a is shown confined by plastic liner 960 over metal sheets 911 forming the enclosure ceiling and overhang; the liner 960 also passes over wood end closure 963 and the beams on which trackway 914 is located for moving insulation 903c on wheels 920 for control of temperature in pond 954a. The fascia 948 serves as a stop for the movable insulation. Fixed insulation 930 under the overhang, reduces loss of desirable pond temperatures. Pond 954a need not be present for the thermosiphon means of wall 904b to operate, but if present and having an interconnecting tubing of not much more than one-half inch internal diameter, water 961 from pond 954a will keep the thermosiphon means filled with water without permitting appreciable thermisphon action between the two bodies of water.

Inner metal sheets 911a and outer metal sheets 911b are fastened by lag screws (not shown) to wood studs (similar to 582 of FIG. 5), to wood roof plate 921 bridging the top of said studs and fastened thereto, and to wood floor plate 912 anchored to concrete floor 905 by bolts (not shown). The thermosiphon element of this embodiment has legs of equal length separated by insulation 930 preferably of closed-cell plastic. The thermosiphon element may be formed by first shaping one-half inch thick insulation 930 to a width which causes it to bend slightly when forced between the aforesaid studs and either of a length shorter than the distance between floor plate 912 and roof plate 921 or, if of the same length, holes must be provided through the insulation near floor plate 912 and roof plate 921. The insulation may be coated with asphalt or hermetically sealed in plastic cladding 988c. Insulation 930 is then inserted into flexible bag 988b of greater volume than the wall cavity and the bag 988b is sealed with provision made at the top for a suitable water inlet and air outlet means (not shown). The thermosiphon element may then be manually inserted between said studs by pressing to slightly bow the insulation 930; the bow creates an edge pressure against said studs which holds insulation 930 in place and, later, prevents any appreciable short-circuiting along these edges of water 961 on opposite sides of said insulation. After adjusting the inserted bag 988b loose enough to fill the wall cavity when under a head pressure of water, and after verifying the passageways are open between the two thermosiphon legs above floor plate 912 and under roof plate 921, metal sheets 911a and 911b are affixed to said studs. The thermosiphon element is then filled with water for operation, preferably in conjunction with movable insulation 903c in framing 970 and movable in trackway 914 to a first position covering wall 904b or to another position, such as wall 904a of FIG. 9, thereby exposing at least a portion of wall 904b.

When exterior metal sheets 911b are exposed to solar rays, and their surface temperature exceeds that of interior metal sheets 911a, water 961 in the outer thermosiphon leg attains a higher temperature and lower density than that in the inner leg and rises owing to displacement by cooler and denser water from the inner leg. The warmed water passes over insulation 930, or through holes provided therein, to the top of the inner leg where it gives up heat to the enclosure through metal sheets 911a. The water moves down through the inner leg as it cools below the temperature at a comparable height in the outer leg and passes under, or through, insulation 930 to be reheated by sheets 911b. This embodiment of my invention is equally efficient in thermosiphon action for cooling the enclosure if sheets 911b are exposed at night to allow radiation to the heat sink of temperature lower than that of the enclosed space.

Though the thermosiphon embodiments disclosed are all shown vertically oriented, they tend to operate more efficiently if inclined to a position more favorable for collection of solar heat and greater radiation to zenith sky; this positioning may, however, require additional roof-supporting members. Also, I have found that instead of centering insulation 930 in the cavity of wall 904b, it may be installed off-center to provide a thinner leg of water to the outside of the thermosiphon and a thicker inner leg. Then, a greater temperature differential is created in the two legs and a more positive thermosiphon effect is created. The volume of water in the thermosiphon system and in any roof or plenum ponds associated therewith, as well as solar radiation intensity or nightsky radiation effect, determines the range of temperatures obtained within the thermosiphon system and within the enclosure. Through the previously described effects, movable insulation panels associated with the thermosiphon embodiments provide a useful control means for maintaining desirable temperatures in the thermosiphon system and in the enclosure of which it is a part.

During humid periods, water evaporation is generally required to cool roof ponds adequately to maintain desired enclosure temperatures by control means of this invention. But, in winter, water evaporation from roof ponds causes cooling which offsets solar heating; to retard evaporation then, the roof pond is covered with glass or plastic capable of transmitting solar radiation. If this cover is spaced above the pond, air between the cover acts as an insulator to retard solar heat loss from the pond, but it also forms a solar still which condenses water on the cover and reflects solar radiation causing a heat loss. The embodiments of my invention now to be disclosed provide thermoal controls of simple types applicable during differing seasons.

The novel embodiments to control roof pond evaporation are illustrated in FIGS. 5 and 6. Pond 554b atop movable insulation panel 503b is an embodiment enclosing said pond in plastic capable of transmitting solar radiation. As best shown in FIG. 6, layflat tubing 589b retards evaporation or loss of water; the tubing thickness may range from 1 to 10 mils or more and may be of polyethylene, polyvinylchloride, or other suitable material in tubing form and closed at the ends (not shown) by electronic sealing, clamping devices, or by folds maintained by suitable means above the level of enclosed water. Upper panel of movable insulation 503b has framing member 570b with an upward extension around the panel to which may be fastened, by adhesive or clamping means, a black plastic liner 560b in which lays the plastic tubing in the form of a bag 589b. Framing member 570b has a downward extension to which are mounted wheels 520 riding in trackway 514 to facilitate moving the insulation and pond 554b.

An inlet assembly with valve 571, suitably fastened to framing member 570b and connected by flexible hose (not shown) to a water source, is used to add water 561 either into bag 589b to form enclosed pond 554b or over bag 589b and confined by liner 560b. Not shown in conjunction with pond 554b, but similar to 580 and 580a shown for pond 554a of FIG. 6, are provided means for draining water from bag 589b and from liner 560b. An enclosed pond of the type of 544b is useful to supplement heat collection by other roof ponds, such as 554a shown in thermal transfer relationship with the enclosure. Daytime positioning of pond 554b is shown in FIG. 5; ponds 554a and 554b are both exposed to solar irradiation when heating is desired. Water heated in pond 554b may overflow, or be drained by gravity through an interconnecting hose and valve means (not shown), into pond 554a, into a water wall which may not be a thermosiphon type described earlier, or it may be pumped to another enclosure or place of use. Water remaining in pond 554b at the end of the day may be allowed to cool to the night sky when the supporting insulation 503b, together with insulation 503a, is in its nighttime position over pond 554a and reheated the following day, or the water may be drained and replaced on the following day when pond 554a is again exposed to solar irradiation. While this, and other embodiments are illustrated and described as operating in conjunction with a second panel of movable insulation, such as 503a, it is apparent that if the embodiment is supported by movable insulation capable of covering pond 554a alone, there will be no need for the second panel of insulation 503a.

Roof pond 554a, shown in FIG. 6 enclosed as described for pond 554b, has an inlet-outlet 580 partially shown passing through wall 504. A second drain 580a, passing through beam 513 and also fitted with a valve means (not shown), removes water external to the plastic bag 589a when a cover such as 564 is not used. Cover 564, made of polyvinylfluoride film or other strong plastic capable of transmitting solar radiation, is secured to beam 513 by clamping members of wood, metal, or plastic of any convenient type and illustrated as the type of lining fasteners 574 of pond 554e. Cover 564 is held taut by weighting means 565 consisting of an elongated metal or plastic rod or pipe used with the V-cover on solar stills of my prior art. Cover 564 and the air space enclosed above pond 554a result in increased temperatures of pond 554a exposed to solar irradiation and retard heat loss at night, thereby providing advantages sometimes needed for obtaining desired temperatures. With pond 554a enclosed, little or no vapor condensation occurs under cover 564.

Rain water collected over pond 554b, or over cover 564 of pond 554a, causes undesired cooling of ponds when exposed for absorption of solar radiation. Means were previously described for draining water above pond 554b; rain collecting on cover 564 can be drained through perforations (not shown) in pipe 565 of FIG. 6, or through small holes in cover 564 under pipe 565 and thence through drain 580a. It has been found that ties of plastic cord 545 of FIG. 5, passing circumferentially around bag 589b, or folds 546 similarly oriented to triple the thickness of the tubing which forms bag 589b, shape said bag and its enclosed pond for better rain drainage. These ties or folds are not required if pressure from enclosed water adequately rounds upward the top surface of bag 589b.

When ponds used for cooling absorb heat from ambient air or from the cooled enclosure in excess of heat loss by nightsky radiation, or when temperatures lower than those produced by radiation alone are desired, water evaporation is an additional cooling means in my embodiment. Roof pond 554c, in FIGS. 5 and 6, is similar in construction to pond 554b and basically identical to pond 554a without cover 564. Enclosed pond 554c is shown best in FIG. 6 as being flooded with water 561 exposed to evaporation, usually on summer nights, when insulation panels 503d and 503c are positioned away from over the pond. Cooled by evaporation, water 561 overlying bag 589c absorbs heat from pond 554c which in turn absorbs heat through ceiling 502. Water for flooding pond 554c may come by gravity from a pond at a higher level, such as pond 554d, or may be from a suitable source through an inlet-outlet and valve assembly 580c partially shown.

Indirect cooling of pond 554c by evaporation of overlying water has several advantages. An algaecide, added to water in pond 554c, will not be diluted or drained away when salt build-up from evaporated water necessitates flushing with fresh water through inlet-outlet assembly 580c which may include a valve, an overflow, or a siphon set to maintain a suitable water depth over pond 554c. For special purposes a liquid miscible with water, or one which should not be lost by evaporation, may be used as pond 554c; glycerine is an example of a water miscible substance and alcohols or petroleum products of volatile nature are examples of heat-transfer media indirectly cooled by evaporation of water overlying their enclosure in bag 589c. Pond 554c may also consist of a fusible hydrated salt, of the sodium sulfate type used in chemical heat-storage cells, which can be cooled by the indirect evaporation of water without the loss of the chemical or change of its fusion characteristics by contacting the water. Movable insulation 503c and 503d can control exposure of pond 554c and control the evaporation of water overlying said pond. Evaporation for cooling purposes is best accomplished at night when exposed water is used; when an adequate water temperature has been reached, the insulation panels can cover pond 554c and thereby stop evaporation of the water overlying the pond 554c to prevent over-cooling of said pond and of the underlying enclosure.

In FIG. 6, plastic bag 589d is shown collapsed as a result of draining water formerly therein through a draining means such as 580 shown with pond 554a. Bag 589d is collapsed when it is desired to evaporate water over insulation panel 503d while minimizing the weight applied thereon. Water 561 added through means such as inlet assembly 571 of pond 554b can then form pond 554d which is provided with an overflow means (not shown) to allow water cooled by evaporation to drain into the water 561 atop pond 554c; or, the cooled water from pond 554d may be transferred to other locations for other use. In daytime, pond 554d may be allowed to remain above bag 589d if the depth is shallow since it would quickly lose heat gained during the day by evaporation at night; moreover, the water would filter out ultraviolet solar rays which deteriorate the cheaper plastics suitable for bag 589d.

The use of open ponds of the type 554e of FIG. 6 has been described in my earlier art and here in reference to thermosiphon walls. Pond 554f, above liner 560f over movable insulation 503f, is shown covered by a transparent plastic film 564 held by clamps 574 and having an elongated weighting means suspended under it in the form of a condensate-collecting trough. Thus pond 554f is enclosed in a solar still with a cover of the type disclosed in more detail in my U.S. Pat. No. 3,314,862. The still of this embodiment consists of pond 554f, cover 564, and condensate collector 565 suitably arranged over movable insulation 503f; it also has conventional means (not shown) for introducing water to be distilled, for removing distilland having a raised salt concentration, and for removing the condensate from collector 565. Pond 554f may be drained in the late afternoon, when distillation yield decreases, and the hot water may be added to pond 554e for space heating of the underlying enclosure, or it may be used for other purposes previously mentioned herein. Pond 554f, of the solar still, may also be drained in the morning after radiating its heat to the night sky and the drained water may be used for space cooling; it is then replaced by water of lower salt concentration before solar distillation starts.

Figure 3:
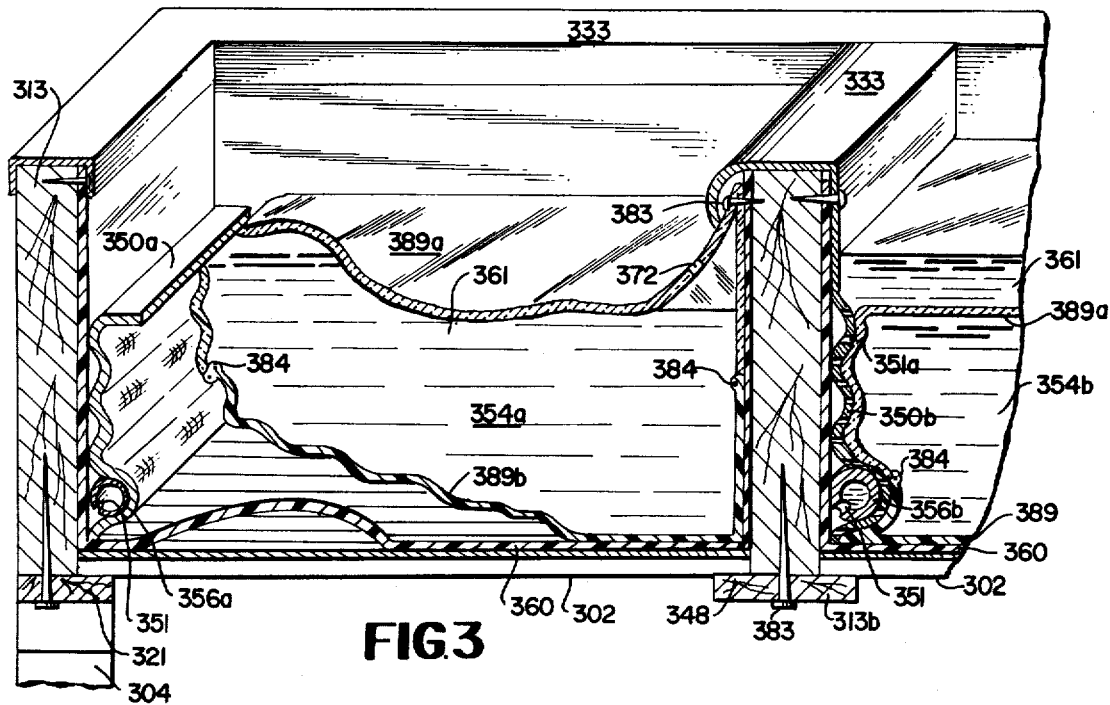
FIG. 3 is a fragmentary diagrammatic and partially cutaway view of means for retarding or increasing evaporation of liquid confined above an enclosure.

Other variations in construction of roof pond embodiments of this invention are shown in FIG. 3 wherein wall 304 and wall plate 321 support corrugated ceiling sheets 302 elsewhere supported by ledge-forming framing member 348 fastened to roof beam 313b by nails 383 or by lag screws. Pond 354a has a black polyethylene liner 360 fastened to beam 313 and capped by coping 333 of plastic or aluminum. Pond 354a is confined in a plastic bag comprising two films united by seals 384. Film 389a is a cover transparent to permit passage of solar rays, while film 389b is preferably black to absorb solar rays to heat pond 354a. To facilitate rain drainage, cover 389a is depressed by drainage member 350a formed of stiff wire mesh or of rigid, perforated plastic and shown corrugated to further ease water drainage to pipe 356a paralleling beam 313 and having holes 351 to allow water to enter pipe 356a for removal by a conduit (not shown). Cover film 389a is shown raised at its right side and fastened to beam 313b by nail 383 to permit escape of air from between the cover 389a and pond 354a through hole 372 in said cover. Venting air through hole 372 is of particular value when adding water to form pond 354a and to minimize bubbles of air between the cover 389a and the surface of pond 354a.

Metal coping 333a crossing over beam 313b serves as flashing and simultaneously forms drainage member 350b with holes 351a which permit water 361 over pond 354b, enclosed by transparent cover 389a and black film 389b, to pass to or from pipe 356b having holes 351 through which water 361 may be introduced or drained through a suitable conduit and valve assembly not shown. Other portions of pond 354b are the same as those of pond 354a. The functions of the enclosed pond 354a and of the flooded water over pond 354b have been previously described in relation to ponds 554b and 554c of FIG. 6, except that here they control temperatures of underlying space without reference to use of movable insulation. If nighttime loss of heat from pond 354a about equals gain during the day, pond 354a fluctuates between a maximum and minimum temperature which may not be much beyond the limits of comfort; then, pond 354a maintains temperatures in the underlying enclosure within an even narrower range owing to the heat capacity effect of the floor, interior walls, room contents, etc. By increasing the depth of pond 354a, the range of maximum and minimum temperatures of said pond can be narrowed; thus pond depth variation is a thermal control means for modulating temperatures in the underlying enclosure.

Pond 354b provides greater cooling than pond 354a and is similarly operable without use of movable insulation. Evaporation of water 361 over pond 354b tends to keep both daytime and nighttime temperatures of pond 354b lower than those of pond 354a and thereby keeps the underlying enclosure cooler.

FIGS. 4A and 4B represent fragmentary sections of a panel of movable insulation with two means for confining water exposed for evaporation and radiant cooling at night or solar heating during daytime. In both figures, beam 413 supports movable insulation panel 403 framed by aluminum extrusions 470 to which wheels (not shown) are fastened to travel in a trackway (not shown) to move insulation 403 from a position left of pond 454 of FIG. 4B to a position overlying said pond containing water 461 confined by liner 460. Pond 454 is supported by a ceiling or other means (not shown) which permits thermal exchange with underlying space or transfer of water 461 to serve elsewhere for thermal control.

In FIG. 4A, a metal extension 469 fastened to frame 470 by rivet 483 confines water 461 in liner 460, serves to support water inlet 471, and provides a base to which liner 460 can be fastened by clamping member 474. FIG. 4B represents a similar construction over movable insulation but with a liner 490 having embedded or adhered protrusions 491. Liner 490 may be a felt saturated with asphalt and protrusions 491 may be stone granules embedded in the asphalt; or liner 491 may be an aluminum sheet to which sand or other granular material is adhered by epoxy cement. The function of the protrusions 491 is to distribute water 461 in a thin layer across the top of insulation 403 to allow it to reach higher or lower temperatures than the deeper water 461 of FIG. 4A. In an alternative construction, protrusions 491 may be floc of fibrous nature which not only distributes water but acts by wicking action to increase the surface for evaporation of water.

FIGS. 4A and 4B represent opposite ends of a panel of movable insulation 403. FIG. 4B shows means for discharging overlying water 461 through a conduit and valve assembly 480 into pond 454, or through connections (not shown) to other thermal control means for utilizing the heating or cooling effect of water 461 introduced at inlet 471 of FIG. 4A. The operation of this embodiment is that of pond 554d of FIG. 6. Additionally, FIG. 4B shows, attached to extension 469 of framing 470 by rivet 483, the deflector 218 discussed in relation to FIG. 2 as a means for causing air passing through the passageway 216a between beams 413, the bottom of movable insulation 403, and end closure 463, to assume lines of flow more nearly parallel to the surface of pond 454 for purposes of increasing evaporation therefrom.

Figure 7:
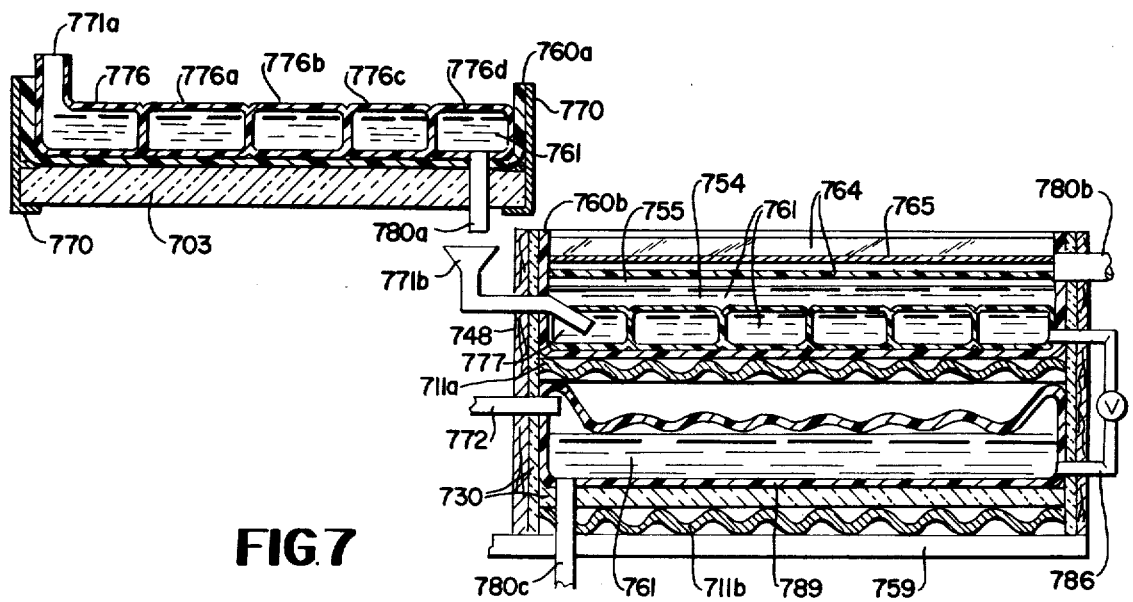
FIG. 7 is a diagrammatic cross sectional representation of a means for heating or cooling and for storing water.

An embodiment of this invention illustrated in FIG. 7 comprises a means for heating or cooling water and for its storage. Water heating by solar irradiation is best accomplished with a preheating means 776 over a panel of movable insulation 703 having a frame 770 to confine said preheater. Attached to frame 770 are previously described means for moving insulation 703 in trackways on beams (not shown) from the daytime position illustrated to a nighttime position overlying pond 754.

Preheater 776 is an interconnected series of tubular passageways 776a, b, c, and d, made in the fashion of an air mattress of black flexible plastic or it may be made of metal interconnecting cells with a blackened upper surface. During a sunny day, water introduced through inlet 771a is heated by solar radiation absorbed by the black upper surface and discharges through outlet 780a which may be a pipe capable of being raised and held, by means not shown, in a position higher than that illustrated; the high position maintains a desirable depth of water 761 in preheater 776 while the illustrated low position permits complete drainage of said water. Water drains from outlet 780a into funnel inlet 771b leading into a superheater 777 made in the manner of preheater 776. Above superheater 777 is water pond 754 within plastic liner 760b laterally confined by wood or metal sidewalls 748 and fixed insulation 730. Above pond 754 is transparent plastic cover 764 shown here as a solar still cover with an elongated weighting and condensate collecting means 765. Although illustrated as a solar still, this portion of the embodiment alternatively may be a transparent cover in contact with pond 754 thus being a water heater like 554b of FIG. 5.

In FIG. 7, draining means 780b removes rain from atop cover 764. Connecting assembly 786 conducts water from superheater 777, supported on corrugated sheets of metal or asbestos-cement 711a, to a water storage container shown as a plastic bag 789 in space intermediate sheets 711a and similar supporting sheets 711b which rest on wooden structural members 759 to which are fastened confining sidewalls 748 and similar end walls (not shown). Connecting assembly 786 has a control valve to regulate flow of water 761 from superheater 777 into storage container 789 fitted with outlet 780c having a conduit and valve arrangement (not shown) leading to the point of use for the heated water. Breather tube 772 permits air to be displaced from storage container 789 as it is fitted with heated water; air displaced above container 789 and under sheet 711a escapes at the edges of the relatively loosely constructed sidewalls 748.

In operation, preheater 776 and superheater 777 are filled with water 761 during early moring hours when outlet means 780a and the connecting means 786 are adjusted to prevent drainage. Any water remaining in the superheater overnight will be at a higher temperature than that in preheater 776 owing to the superheater 777 having been covered at night by insulation 703. As solar energy raises the temperature of pond 754 and of water 961 in superheater 777 to a useful range, water in preheater 776 is being warmed. Then cooler water introduced at inlet 771a displaces warmed water into superheater 777 where it is further heated before passing into storage container 789. To maintain higher water temperatures in storage container 789 than the average temperature of water in superheater 777, fixed insulation may be inserted between the upper surface of sheet 711a and liner 706b.

When solar intensity decreases, draining outlet 780a is adjusted to remove warmed water from preheater 775 and to displace hot water from superheater 777. Then insulation 703 is postioned over superheater 777 and pond 754 to retard heat loss to the night sky. The functions of pond 754 are several. When available fresh water is limited, its heat storage capacity may be too small to store all of the available solar heat. Then pond 754 can consist of impure water to be distilled to produce more fresh water; or, it may be made deep enough with impure water to store the available solar energy at a useful temperature. Then when warm water is drained from preheater 776 in the evening, the water will be heated in superheater 777 by conduction from pond 754. In addition, water over superheater 777 filters out ultraviolet rays capable of deteriorating an inexpensive plastic which may be used for making superheater 777. If pond 754 is not needed, it may be drained by means not shown; then water 761 in superheater 777 is heated in the manner of pond 554a of FIG. 5 and higher temperatures are obtained in superheater 777.

In the embodiment of FIG. 7, the heat exchange relationship between pond 754 and water 761 in superheater 777 is emphasized. As a variation of this heat exchange relationship, the embodiment of FIG. 8 is another form of solar still in heat exchange relationship to provide hot water for domestic purposes or for space heating and may be regarded as a water heater. The embodiment in other form may be installed on a roof though illustrated in FIG. 8 on the ground. It is constructed in three sections under cover 864 with insulation 803 movable above said cover. The first section is preferably a wide but shallow distillant basin 891 having a bottom higher than that of second distilland basin 892 in a second section of the still. Conduit and valve assembly 856 permits distilland to flow from said first to said second basin, and means 880a are provided to drain distilland from the second basin 892. Under the cover 864 and overlying basin 892 is a third distilland basin 893 the bottom of which is preferably at a higher level than distilland in basin 891. Means are provided for excess distilland introduced through a feed pipe (not shown) to overflow from basin 893 through conduit 880b to basin 891; or basin 891 may have a separate feed. Preferably, basins 891 and 893 are shallower than basin 892 which is able to contain all distilland drained from basin 891.

A third section of the still, preferably with a bottom below that of basin 893 to permit collection of condensate flowing from the underside thereof, comprises a distillate reservoir 894 with a partially shown assembly 880c of conduits, valves, and, if necessary, a pump for removing distillate 895. Condensate collected on cover 864, or on the under surface of basin 893, is conducted, by virtue of the shapes thereof, to discharge point 896 or 986a and drains into reservoir 894. Discharge point 896a is formed when cover 864 is deflected downward by weighting means 865 held in position by tiecord 866 fastened to framing member 863 supporting cover 864. Materials from which this embodiment are made have been described herein or are well known in the solar still art.

In operation, distilland in basins 891 and 893 is distilled by solar radiation transmitted through cover 864; vapors condensed on said cover drain into reservoir 894. When solar intensity and distillation rate have passed their peaks, hot distilland 898 from basin 891 is drained into basin 892 to prevent heat loss by direct radiation to the sky; also, insulation 803 is moved from its daytime position over basin 894 to nighttime position over basin 893 to prevent heat loss by direct radiation to the sky therefrom. Vapors from hot distilland 898 then condense on the cooler under surface of basin 893 giving up latent heat thereto and causing distilland 899 therein to distill longer than it would if distilland 898 had not been drained into basin 892 to cause multiple effect distillation. Distilland in basins 892 and 893 have higher temperatures the following morning than they would have if distilland 898 had been allowed to cool at night in basin 891; then, warm distilland 898, except for that portion desired to be drained, can be pumped back into basin 891 through conduit 880a and a pump (not shown) and additional make-up water added to the first and third basins as needed. With warm distilland in basins 891 and 893, distillation starts earlier in the day when insulation 803 is returned over reservoir 894. Thus, the production of the still is substantially increased; the still may be of any convenient shape.

Though this embodiment is described with reference to a single second basin 892 underlying basin 893, obviously distilland 898 from one or more basins such as 891 may be drained into a plurality of basins underlying one another and all underlying basin 893, all adapted to drain condensate into reservoir 894 thus increasing multiple effect distillation. Moreover, this distillation process is improved without the presence of, or movement of, insulation 803; though I prefer using insulation 803 to keep distilland 899 warm at night and to keep distillate 895 cool during the day to serve as a condensor for vapors from basins 891 and 893.

The embodiment of my solar still - water heater shown in FIG. 8 has as the bottom of basin 892 the top of a rigid or semi-rigid metal or plastic hot water tank 859 through which high quality water passes through inlet and outlet means 853a and 853b, heat from distilland 898 in basin 892 passes through wall 846 of tank 859 to water 847 therein. Alternatively, heat exchange is obtained through tubes disposed within basin 892 as well understood by those versed in the art. In these embodiments, a water supply is heated by water transferred from a first location in which it is heated to a second location in which heat exchange occurs; and, in my preferred embodiment, movable insulation 803 can be positioned by means of attached wheels (not shown) and trackway 814. The water 847, thus heated, may be used for domestic purposes or for space heating by means previously described.

Optimum use of the heating and cooling means herein described depends, at times, on their use in conjunction with a fancoil in space to be thermally controlled. Air stratification in a room underlying and in direct thermal exchange with a roof pond may cause air at 5-foot height to be 8° warmer in summer than pond temperatures at 8-foot ceiling height. This differential can be reduced to 2° by circulating roof pond water through a fan-coil unit which circulates the room air and absorbs heat which is transferred from the fancoil to the roof pond. This use of a fancoil provides novel zone-control means for regulating temperatures in enclosures.

FIG. 10 represents an embodiment of this invention. Two rooms are shown with roof ponds and with a fancoil in the common wall 4a. Walls 4b and 4c are representative of the other walls of the two rooms on which wall plates 12 and wood beams 13 are secured. Corrugated metal sheets 11 supported by the walls or fastened to the beams form a ceiling over the rooms and an exterior overhang which shades wall 4c. Wood beams 13 divide the roof into bays with plastic liners (not shown) confining roof ponds 54a, b, c, and d shown in thermal exchange with underlying space in the rooms. Roof pond 54c, above the overhang, is partially supported by bracket 59 suitably fastened to wall 4c. Insulation 30 is affixed to the underside of metal sheets 11 forming the bottom of pond 54c. Details of pond construction and of movable insulation 3 mounted with wheels in trackways atop beams 13, are not shown; they may be of different types as shown in FIG. 6.

A fancoil unit of standard type is represented in FIG. 10 by a fan 22 and a bend of metal tubing 23; the water circulating pump is not shown, nor is the conventional system of dampers which can control air flow to and from the fancoil. When the fancoil is not in use, rooms constructed as shown are heated or cooled by the static roof ponds. To permit maximum use of a fancoil, the ponds are connected in series; interconnection 86 may be of the bulkhead union type or plastic tubing adequately sealed to the liners of adjacent ponds and preferably positioned to connect all ponds in series to circulate water therein through fancoil tubing 23 suitably connected through pond liners to conduct pumped water from pond 54b to pond 54c. A conduit and valve means 80 is provided to fill or drain the ponds and to interconnect ponds 54e and 54a through piping (not shown).

When space of a first room, enclosed by walls 4a and 4b, is to be preferentially cooled, the fan-coil unit is turned on with dampers arranged to circulate through the fancoil only air from said first room. Cooled water 61 from pond 54b pumped through coil 23 then absorbs heat from the circulated air and is discharged to pond 54c creating a small head pressure of water therein which causes water in pond 54c to pass through interconnection 86 to pond 54d and eventually, by way of other pond interconnections, to pond 54b and to the intake tubing 23 of the fancoil. Effects of this fancoil use are several. Recirculation of air, and extraction of heat from it, causes said first room to have a temperature only a few degrees higher than that of pond water 61 passing through the fancoil. The second room, enclosed by walls 4a and 4c, will be several degrees warmer partly owing to air stratification and partly because overlying ponds 54c and 54d are warmer than those over said first room by virtue of the heat extracted from the first room. In preferred operation, the warmest water is discharged from pond 54d to pond 54e above the overhang. This is beneficial primarily at night when insulation 3 has been moved away from over the ponds; then pond 54e will cool considerably by radiation and evaporation before water from it enters ponds 54a and 54b where it affects the temperature of the first room.

When the second room is to be preferentially cooled, the fancoil dampers are adjusted to recirculate only air of that room through the fancoil. The direction in which the fancoil pump circulates pond water is preferably reversed. The second room then equalizes at a temperature nearer that of the roof ponds than does the temperature of the first room and, at night, pond 54e serves to cool the circulating water before it enters ponds 54d, 54c, and the fancoil thus widening the temperature differential between the rooms. If the first room represents a living room and the second room a bedroom, adjustment of the dampers and reversal of direction of circulation in the roof ponds can assure maximum cooling in the room occupied at the particular time of day — the living room in daytime and the bedroom at nighttime.

The fancoil may be used in several ways to cool rooms in a multistory building. The top story rooms may be directly cooled by thermal exchange with overlying ponds also connected to a fancoil located in lower story rooms cooled by the roof pond water circulated through the fancoil. Alternatively, using forced-air evaporation of water in floor plenums as previously described, the fancoil recirculates water cooled in said floor plenums. If one regards movable insulation 3 as the floor of one or more rooms above the rooms of FIG. 10, this floor would rest on beams 13 leaving air spaces above the five ponds shown. A flower at an end of the ponds forcing unsaturated air across water 61 in the plenum ponds would cause evaporation and directly cool the ponds and also by direct thermal exchange cool rooms above and below the ponds. The use of the fancoil to circulate water of the plenum ponds and to circulate air in the underlying, or overlying, room in which it is located would provide additional cooling.

The numerous embodiments of this invention may be used in many combinations with, or without, movable insulation which may be a single panel affecting thermally one or more bodies of a liquid heat-storage material or a plurality of insulation panels affecting thermally one or more bodies of said liquid. FIG. 6 illustrates some combinations including a unified pandl 503b, 503d, and 503f, though operation of the separate embodiments shown in FIG. 6 was described as if these three panels were also movable separately.

Useful combinations of embodiments of this invention with conventional heating and cooling means are also encompassed. On sunless days, the roof ponds, or plenum ponds, in direct heat exchange relationship with space above or below may have water added of higher temperature from a gas or electric water heater through a conduit and valve system controlled manually or by a thermostat. The radiant heat from a kitchen stove may also heat overlying ponds and distribute this heat to other areas through conduction in, or circulation of, the water in roof or plenum ponds. For cooling, a conventional gas or electric refrigeration unit can be used in rooms underlying those directly cooled by roof or plenum ponds or by fancoils circulating water from such ponds. Air dehumidified by the refrigeration unit can be directed to cool lower rooms and to pass through ducts or stairwells to upper rooms cooled primarily by embodiments of this invention which are not capable of dehumidification. The air from the upper rooms, still partially dehumidified, can then be exhausted, with the aid of a blower if necessary, through or over roof or plenum ponds to cause more evaporative cooling than more humid exterior air.

As previously described, cool air from the ponds can be used to cool other areas directly or indirectly. Air blown into the plenum of pond 54a may, by means such as blower 500, openings 516, 516b, and 516a of FIGS. 5 and 6, pass through the plenum zone above pond 54b thence to the plenum zones above ponds 54c and 54d to be discharged, in a manner previously made clear, to flow downward near the exterior of wall 4c. Among the combinations forming a part of this invention, which FIG. 10 clarifies, is the circulation of water in the roof ponds 54a, b, c, and d, circulation of forced air through the plenum zones above these same ponds and through a cavity wall 6 to form an air curtain and circulation of air in rooms underlying the same ponds by means of a fancoil. It is possible to arrange one motor to power all of the circulating systems.

Although the embodiments of the invention illustrated in FIGS. 1 through 10 have been described with considerable particularity and other embodiments have also been generally referred to, it is expressly understood that the invention is not restricted thereto, as the essence of the disclosed invention is capable of receiving a variety of expressions which will readily suggest themselves to those skilled in the art. Obviously, changes may be made in the arrangement, proportion and composition of parts and certain features may be used with other features without departing from the spirit of this invention. I do not wish, therefore, to be limited to the precise details of construction and operation set forth but desire to avail myself of all aspects within the scope of the appended claims.

I claim:

1. The method for indirect cooling of an at least partially enclosed room by means of evaporating a liquid from a horizontally disposed reservoir confined in at least one plenum formed at least in part by a horizontally disposed structural portion of said room, wherein the steps are:
   a. Transferring heat from air contacting said structural portion of said room through said structural portion and into said liquid,
   b. Causing flow of air unsaturated with said liquid through said plenum,
   c. Evaporating some of said liquid into said flowing air thereby cooling said liquid and causing said flowing air to be more nearly saturated,
   d. Transferring heat from said flowing air into said liquid thereby at least partially cooling said air,
   e. Causing said cooled air to discharge from said plenum.

2. The method of claim 1 in which the at least partially cooled air discharged from said plenum passes into a at least one additional plenum containing a horizontally disposed reservoir of said liquid where it is further cooled and becomes even more nearly saturated with vapors of said liquid evaporated by heat transferred from room air contacting the structural portion associated with said additional plenum.

3. The method of claim 1 in which the at least partially cooled air discharged from said plenum is caused to flow downward over an outer wall of said room and absorbs heat from said wall which then transfers less heat into said room.

4. The method of claim 1 in which the at least partially cooled air is caused to flow through a second plenum in which said air absorbs heat from a room structural element forming at least a portion of said plenum and which is absorbing heat from room air contacting said element.

5. The method of claim 1 in which the at least partially cooled and more nearly saturated air is discharged into said room and mixes with the air therein and thereby increases the moisture content of the mixed air within the room.

6. The method of claim 1 in which the further cooled air is caused to flow downward over an outer wall of said room and absorbs heat from said wall.

7. The method of claim 1 in which the further cooled air is caused to flow through an additional plenum in which said air absorbs heat from a room structural element forming at least a portion of said additional plenum and which is absorbing heat from room air contacting said element.

8. The method of claim 1 in which the further cooled and more nearly saturated air is caused to discharge into said room and is mixed with air therein thereby cooling said air in said room and increasing the moisture content of air within said room.

9. The process for changing the temperature of space at least partially enclosed by a plenum in which an evaporable liquid is confined which comprises the steps of:
   a. introducing said evaporable liquid within said plenum, and
   b. forcing air unsaturated with said liquid through said plenum, and
   c. evaporating a portion of said liquid into said air unsaturated with said liquid forced through said plenum, and
   d. transferring heat from said partially enclosed space into said plenum and absorbing said heat in the cooled remainder of said liquid.

10. The method of temperature control of a plurality of portions of space within at least one structure at least partially enclosed by a plurality of structural elements of which a first element horizontally disposed partially encloses a horizontally disposed reservoir of an evaporable liquid in a plenum, the steps which comprise:
    a. transferring heat from said space contacting said first element through it to said liquid in said reservoir,
    b. causing air unsaturated with said liquid to flow through said plenum and over said reservoir,
    c. evaporating a portion of said liquid into said air thereby cooling said reservoir, said air, said first member, and said first portion of said space.

11. In the method of claim 10, the additional step of causing said cooled air to be discharged from over said first reservoir and causing it to cool a second structural element in general thermal exchange with a second portion of said space thereby cooling both said first and second portions of said space.

12. In the method of claim 10, the additional step in which said cooled air is discharged from said plenum and is caused to flow downward within an essentially dry plenum oriented other than horizontally and formed at least in part of a second structural element which is cooled by said downward flowing air and which cools a second portion of space at least partially confined by said second structural element.

13. In the method of claim 10, the additional step in which cooled air discharged from said plenum is caused to flow downward over an exterior structural element partially enclosing said space thereby absorbing heat impinging on said exterior structural element and preventing transfer of said heat through said exterior element to space at least partially enclosed by the opposite side thereof.

14. In the method of claim 10, the additional step in which at least a portion of the cooled air discharged from said plenum is caused to enter said space partially enclosed thereby, mixes with the air therein, and lowers the temperature and increases the humidity of said space.

15. In the method of claim 10, the additional step in which cool air discharged from over said first reservoir is caused to pass into at least one additional plenum containing a reservoir of said liquid discontinuous from said first reservoir thereby further cooling said air, and cooling said reservoir in said additional plenum, cooling a structural element at least in part forming said additional plenum, and cooling space in general thermal exchange with said structural element at least in part forming said additional plenum.

16. In the method of claim 15, the additional step which comprises causing the cooled air from said additional plenum to flow downward over an exterior structural element partially enclosing space in thermal exchange with said exterior structural element thereby absorbing heat impinging on said exterior structural element and preventing transfer of said heat through said exterior element to space at least partially enclosed by the opposite side thereof.

17. In the method of claim 15, the additional step which comprises causing the cooled air discharged from said additional plenum to flow downward within an essentially dry plenum oriented other than horizontally and formed at least in part of a second structural element which is cooled by said downward flowing air and which cools a second portion of space at least partially confined by said second structural element.

18. In the method of claim 15, the additional step in which at least a portion of the cooled air discharged from said additional plenum is caused to enter said space partially enclosed thereby, mixes with the air therein, and lowers the temperature and increases the humidity of said space.

* * * * *